May 15, 1934.  G. CHRISTENSEN  1,958,846
APPARATUS FOR REMOVING MILK AND CREAM FROM CANS
Filed May 19, 1930  4 Sheets-Sheet 1

INVENTOR.
Godfrey Christensen.
BY
Townsend, Loftus & Abbett
ATTORNEYS.

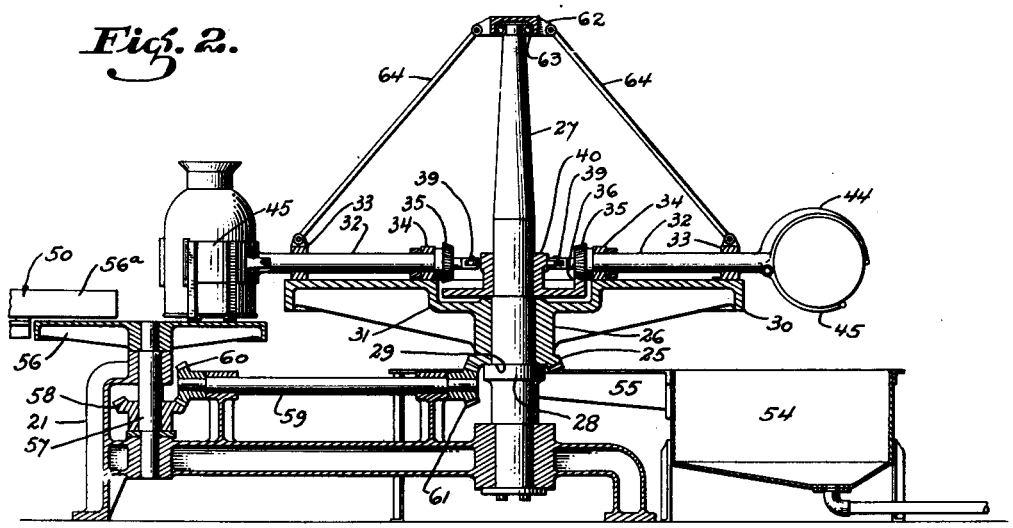
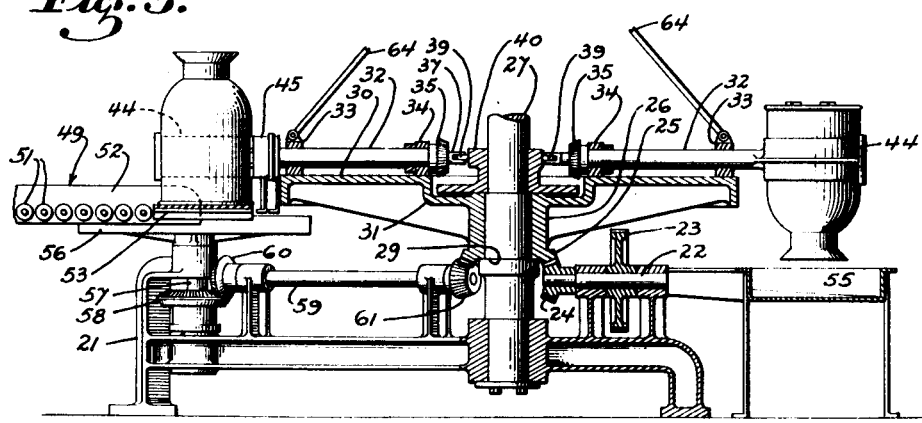
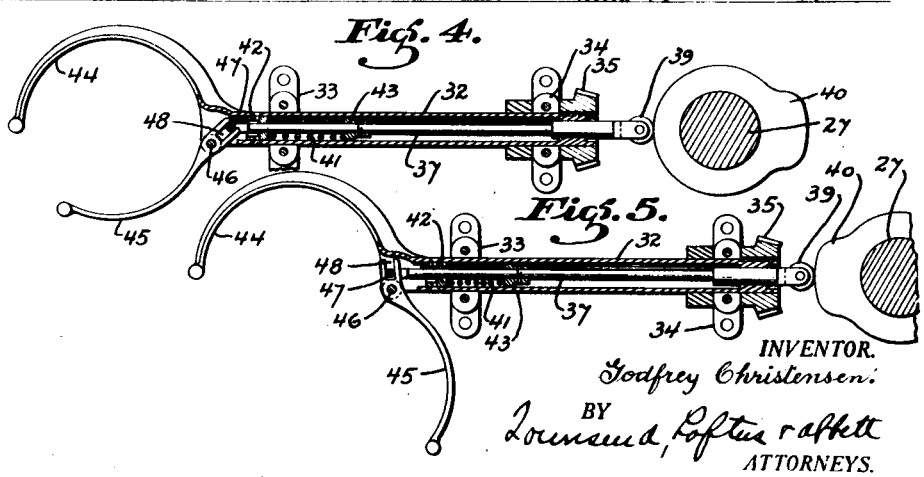

INVENTOR.
Godfrey Christensen.
BY
Townsend Loftus & Abbett
ATTORNEYS.

May 15, 1934.    G. CHRISTENSEN    1,958,846
APPARATUS FOR REMOVING MILK AND CREAM FROM CANS
Filed May 19, 1930    4 Sheets-Sheet 4

INVENTOR.
Godfrey Christensen.
BY
Townsend, Loftus & Abbett
ATTORNEYS.

Patented May 15, 1934

1,958,846

UNITED STATES PATENT OFFICE 1,958,846

APPARATUS FOR REMOVING MILK AND CREAM FROM CANS

Godfrey Christensen, Oakland, Calif.

Application May 19, 1930, Serial No. 453,663

20 Claims. (Cl. 221—69)

In the dairy industry it frequently happens that a great many cans or bottles of milk or cream remain unsold and it is not advisable to keep them for sale the next day since it is not certain how long the contents may remain sweet after standing for a day. It is, therefore, incumbent upon the dairyman to collect and take back the unsold filled bottles and cans of milk and cream, whereupon the contents are put to other uses.

The cream is collected in one or more vats and the milk is likewise collected.

It is, of course, to be understood that my device may be used for other purposes, and another important function of my invention is to dump cans of fresh raw product as received at the plant.

This invention relates to methods of and apparatus for handling the returned cans and bottles so that the contents will be collected in suitable containers.

An object of the invention is to provide a machine which will pick up a can or bottle from a conveyor, on which a series of such containers are being fed to the machine, carry the container over a tank, rotate the container so that the contents will be poured therefrom into the tank, and continue the rotation of the container until it is again upright, and set it onto a conveyor which takes it away from the machine.

Another object of the invention is to provide a means for removing the caps from milk or cream bottles so that the contents may be poured therefrom.

Another object of the invention is to provide a means for removing any cream adhering to such caps and to collect the same.

Another object of the invention is to provide means for removing cream adhering to the interior of the container.

Other objects of the invention will be apparent from the following description.

Referring to the drawings which form a part hereof:

Fig. 2 is a section along the line II—II of Fig. 1,

Fig. 3 is a section along the line III—III of Fig. 1,

Figure 1:
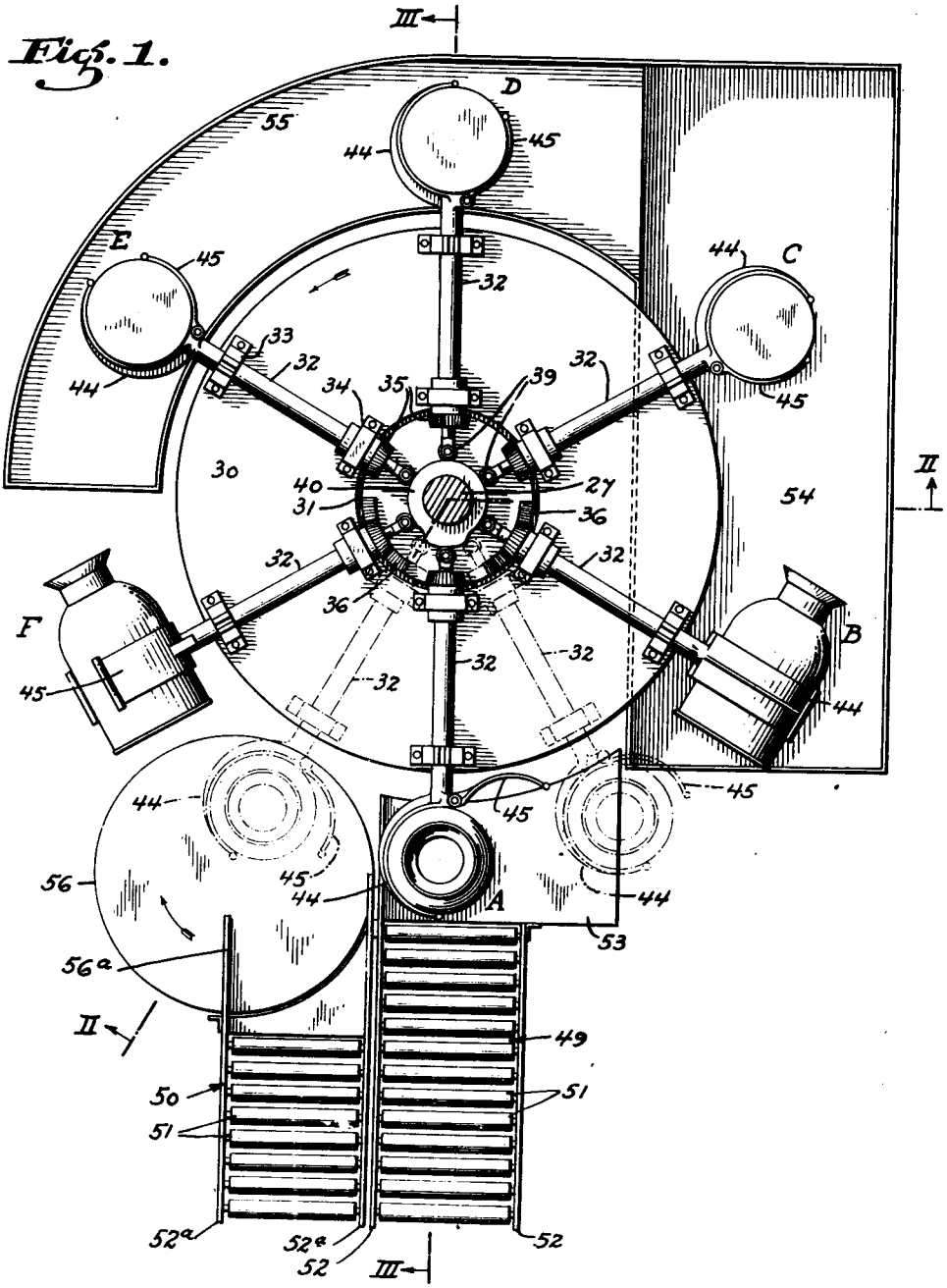
Fig. 1 is a plan view of my machine as applied to cans.
Figure 6:
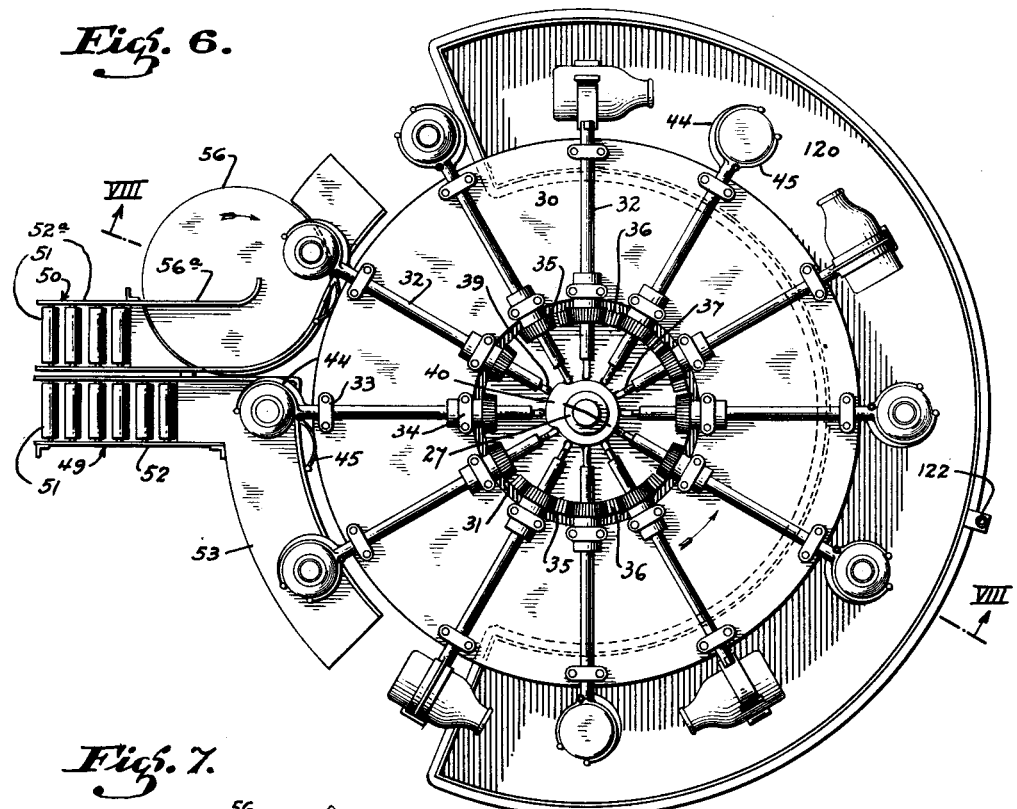
Figure 7:
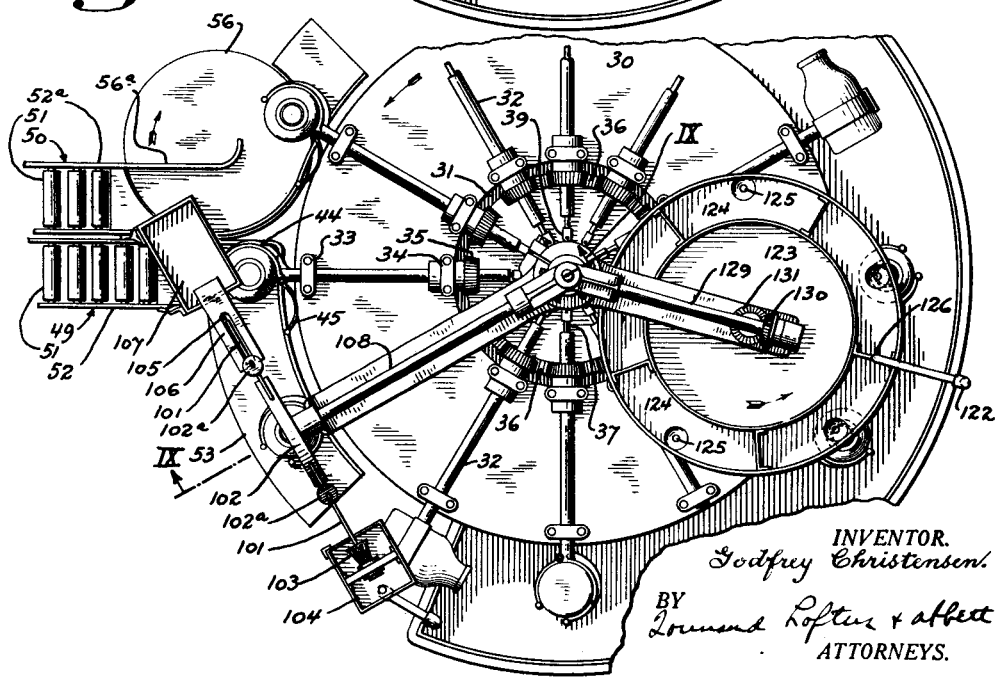
Figure 8:
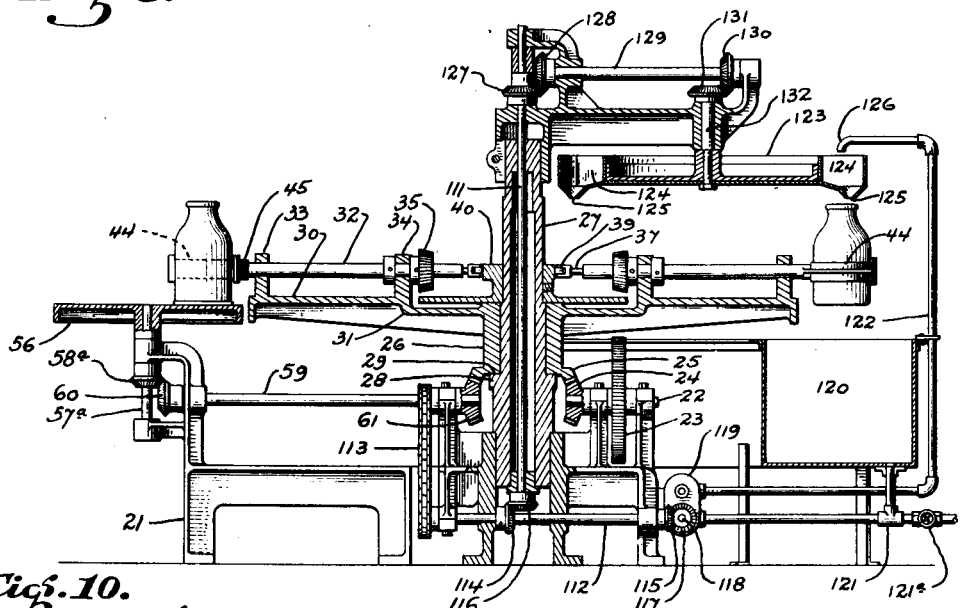
Figure 10:
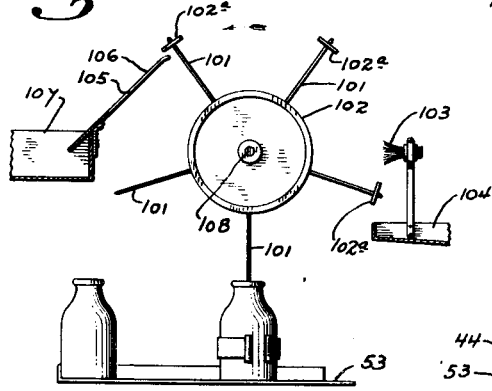
Figure 9:
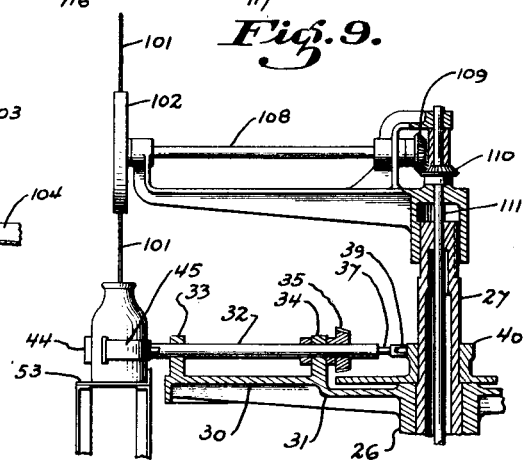
Figure 11:
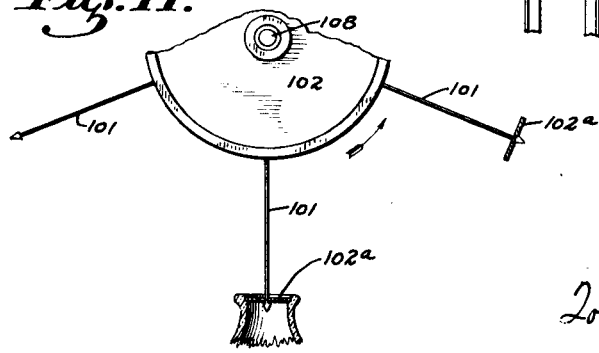

Fig. 4 is a plan view, partly in section, of the can holding and carrying mechanism in closed or operative position, Fig. 5 is a view similar to Fig. 4, showing the device in open or inoperative position, Fig. 6 is a plan view of the machine as applied to bottles, with the cap remover and rinser removed, Fig. 7 is a plan view, similar to Fig. 6, with the cap remover and rinser shown, Fig. 8 is a sectional view along the line VIII—VIII of Fig. 6, Fig. 9 is a sectional view along the line IX—IX of Fig. 7, Fig. 10 is an elevation of the cap removing device in connection with the means for removing the cream adhering to the cap, and Fig. 11 is a detail view similar to Fig. 10 and on a larger scale.

My device comprises a suitable supporting base or frame 21, upon which a driving shaft 22 is suitably journaled. A suitable driving member, such, for example, as a pulley 23, is fast to the shaft so that suitable motion, either continuous or intermittent as required, may be imparted to the shaft from a prime mover by means of a belt or equivalent device running over the pulley 23. The prime mover and belt form no part of my invention and, therefore, are not shown in the drawings.

A bevel gear 24, fixed to the end of the shaft 22, intermeshes with a bevel gear 25 at the bottom of a rotating sleeve 26 which is suitably supported for rotation about a fixed shaft 27, to which a collar 28 is fixedly attached, while a shoulder 29 of the rotating sleeve 26 abuts against this collar as the sleeve rotates. The sleeve 26 carries a table 30 having a central depression 31. A number of radial arms 32 are supported for rotation in bearings 33, 34 thereon, and these arms are hollow for a purpose which will appear hereinafter.

Each of the arms 32 carries at its end a gear 35 meshing with an intermittent rack 36 which is fixed against rotation and located in the depressed central portion 31 of the table whereby rotation may be imparted to the arms 32 at suitable points in their travel. A rod 37 extends through each hollow arm 32, terminating at one end in a bearing in which a horizontally rotating wheel 39 is mounted to roll in contact with a fixed cam 40, whereby the rod 37 will be pushed to the left, as shown in Fig. 5, by the cam 40 as the wheel 39 rides thereover. A coil spring 41 is compressed between a shoulder 42 on the inner face of the hollow arm 32 and a shoulder 43 fixed to the rod 37, whereby this spring will tend to keep the wheel 39 always in contact with the face of the cam 40, so that the rod 37 will be moved either to the right or to the left, as shown in Figs. 4 and 5, as the cam rotates.

Fixed to the radial arm 32 is a can gripping member 44, about semicircular in contour, while a corresponding movable gripping member 45 is pivoted to a fixed point at 46. A projection 47, on the end of the rod 37, rides in a slot 48 formed in the end of the member 45 so that reciprocation of the rod 37 will move the can gripping member 45 to open and closed positions.

A suitable conveyor 49 is provided for conveying a series of cans to the machine, while another conveyor 50 is provided for removing the cans from the machine. The conveyors 49 and 50 may be of any desired structure, but they are shown in the present instance as consisting of a series of rollers 51 mounted for rotation in frames 52 and 52a. The cans may be pushed along the rollers by hand, or the end of the conveyor 52 further away from the machine may be somewhat higher than the end nearer the machine so that the cans will move along and roll down the conveyor 49 by gravity onto a table 53 where they may be placed manually in proper position to be taken up by the machine; while the end of the conveyor 50 further away from the machine may be higher than the other end thereof.

The cam 40 and the rack 36 are so designed and positioned that as a can reaches station A, a radial arm 32 will approach it in upright position and with the can grasping member 45 open. As the device is rotated counterclockwise looking down upon it, the fixed can grasping member 44 will contact with the can, whereupon the movable can grasping member 45 will be moved to closed position, as shown in Fig. 4. Thereupon the radial arm 32 will rotate by reason of the bevel gear 35 meshing with a series of teeth on the rack 36, and this rotation is so adjusted that the contents of the can will begin to pour therefrom after the mouth of the can is over a tank 54 (station B). The can assumes an upside-down position (station C) before passing away from over this tank. As the can passes away from over this tank it remains in upside-down position (station D) while passing over a drainboard 55 to catch any drippings from the can and conduct them to said tank. The rotation is then continued (station E) to turn the can (station F) again into upright position before it reaches a rotating table 56. This table is suitably rotated clockwise and at sufficient speed so that when a can is placed thereon in upright position, the can grasping member 44 opens and the can will be automatically removed entirely from the can grasping unit by the rotation of the table on which it stands and will be moved around and along the guide 56a to the conveyor 50 which removes the can from the machine. This conveyor 50 may be any suitable type, but preferably comprises a series of rollers similar to those in the conveyor 49, with the outer end of the conveyor lower than the end nearest the machine, so that the cans will pass along this conveyor by gravity as they are placed thereon.

Suitable mechanism is provided for rotating the table 56, and this may comprise a rotating shaft 57 having a bevel gear 58 affixed thereto. A rotating shaft 59 has a bevel gear 60 fixed thereto and intermeshing with the bevel gear 58, there being a bevel gear 61 on the shaft 59 to intermesh with the bevel gear 25. The gears are so proportioned that the table 56 will rotate with sufficient speed to take the can away from the can grasping unit when it is opened.

The vertical fixed shaft 27 is tapered at its top about which a support 62 is rotatable by means of anti-friction bearings 63, and braces 64 run from the support 62 to support the outer ends of the arms 32, and they are preferably connected to the bearings 32 in which the arms rotate.

I provide a somewhat similar device for handling bottles as I do for handling the cans. I provide, in addition, a means for removing the paper caps 102a from the bottles as they pass this cap removing means, which comprises a series of arms 101 supported on a rotating wheel 102 moving in timed relation to the movement of the bottles as they pass thereby. These arms are of such length that the ends thereof will pass through the paper caps of the bottles, the ends of these arms being so shaped that it is easier for the arm to pass through the cap in one direction than in the other, as by providing the end thereof with a barb or spear head, whereby the paper caps will be speared and pulled away from the bottles. It will be seen that the arms 101 swing upwardly as the bottles pass horizontally to the right, thereby pulling the cap from the bottle and carrying the cap past brushing means 103, which brushes therefrom any cream adhering thereto and allows the same to fall into a trough 104 provided therefor, whereby the cream, which would otherwise adhere to the caps, may be collected. As the arms continue their rotation in the direction of the arrow shown in Fig. 10, they pass into a narrow slot 105 in an oblique platform 106, this slot being wide enough to permit the arms 101 to pass easily therethrough but sufficiently narrow to retain the caps on the platform, so that as the arms are withdrawn therefrom the caps will slide into a container 107 provided therefor wherein they are thus collected. The rotating wheel 102 is fixed to a rotating shaft 108, which is provided at its end with a bevel gear 109 meshing with a bevel gear 110 on a shaft 111. This modification is, similarly to that first described, also driven by a suitable source of power operating a belt (not shown) which rotates the pulley 23 mounted on the shaft 59, whereby this shaft is rotated.

A shaft 112 is driven from the shaft 59 by means of a belt or chain 113. The shaft 112 is provided with two bevel gears 114, 115, the bevel gear 114 meshing with a bevel gear 116 on the shaft 111 and thereby driving it, while the bevel gear 115 meshes with a bevel gear 117 on a driving shaft 118 of a pump 119. I provide a tank 120 for containing warm milk which is fed to the pump 119 by means of piping 121 and which is forced by the pump through the pipe 122 to a distributor for distributing the warm milk to the various bottle as they pass the rinsing station. This distributor comprises a trough 123, divided into a series of compartments 124, each compartment being provided with a small outlet 125 in the bottom thereof and this outlet is smaller than the mouth of the bottle so that as the bottle and the trough move in a somewhat different path the outlet 125 of a compartment will be over the mouth of a bottle for a period of time sufficiently long to enable all the fluid in a compartment to flow into the bottle thereunder.

Warm milk is fed from the tank 120 by means of the piping 121, pump 119 and pipe 122 to the spout 126 which remains in fixed position while the various compartments of the trough pass thereunder, so that warm milk is fed into one trough for a fixed period of time, that is, while it is under the spout, and then into the next trough while another bottle is under the outlet thereof, and so on.

The pipe 121 may be provided with a valve 121a for draining the tank, pump, and appurtenant pipes.

A bevel gear 127 is fixed at the upper part of the shaft 111 and this meshes with a bevel gear 128, fixed on a shaft 129 which carries a bevel gear 130 meshing with a bevel gear 131 on a shaft 132 which carries and rotates the trough 123.

A bevel gear 60, fast on the shaft 59, meshes with the bevel gear 58a fast on the shaft 57a to which the rotating table 56 is attached, whereby this table is suitably rotated.

In the modification of my invention as applied to cans, I have shown a device wherein the cans are given one complete tipping rotation during their travel in the machine so that the contents of the can is poured therefrom and the cans are drained and brought back into upright position and then removed from the machine.

For the treatment of cream bottles I have shown a device which rotates the bottle to pour the cream therefrom and then continues the rotation to bring the bottle back into upright position, whereupon it is filled with warm milk and again rotated to pour the warm milk now containing the cream therefrom into the tank 120, and then again to bring the bottle into upright position, whereupon it is released from the machine as described.

The motors for driving the machines embodying my invention may drive them either continuously or intermittently, as circumstances may make desirable, and for doing this any suitable means maybe employed in connection with my invention.

While I have shown and described the preferred features of my invention and the preferred embodiments thereof, it is to be understood that I have done so merely by way of illustration and not as a limitation of the invention, the scope of which is defined in the appended claims.

Having described my invention, what I claim and desire to secure by Letters Patent of the United States is—

1. In a machine of the class described, radially arranged arms, container holders at the ends of said arms, mechanism to open and close said holders, mechanism to rotate said arms about a common axis, and mechanism to rotate said arms each about an individual axis.

2. In a machine of the class described, a rotatable table, hollow arms mounted for rotation on said table, container grasping members at the ends of said arms comprisng members fixed to said arms and members pivoted to said arms, rods passing longitudinally through said arms, a connection between the outer ends of said rods and said pivoted members, a fixed cam, a fixed segmental rack, bevel gears on said arms, means to urge said rods against said cam, and means to rotate said arms about said cam.

3. In a machine of the class described, a rotating hub, pins projecting from the periphery thereof, means to move a series of bottles having caps therein past said rotating hub, a sweeping device, and means to rotate said hub in timed relation with the movement of said bottles to register said pins exactly with said bottles and to carry the removed bottle caps in contact with and past said sweeping device to remove therefrom material adhering thereto.

4. In a machine of the class described, radially arranged arms, container holders at the ends of said arms, mechanism to open and close said holders, mechanism to rotate said arms about a common axis, and mechanism to rotate said arms a plurality of times each about an individual axis for each rotation about said common axis.

5. In a machine of the class described, mechanism to move a series of containers having openings in the tops thereof through a cyclic path, a series of tanks forming a closed cycle, each said tank having an opening in the bottom thereof, mechanism to move said series of tanks through a cyclic path, said second path being over said first path at at least one point, said openings in the bottoms of said tanks being smaller than the openings in the tops of said containers, and a means having a fixed outlet to supply liquid to said tanks as the openings thereof are over said openings of said containers.

6. In a machine of the class described, means to move a series of containers serially through the same path, means to rotate said containers to dump them at a point in said path, means to continue the rotation of said containers until upright at a point in said path, means to supply rinsing fluid serially to said containers when in upright position, means to dump said rinsing fluid therefrom at another point in said path, and means to collect separately said dumped contents and said dumped rinsing fluid.

7. In a machine of the class described, means to move milk bottles having caps serially through the same path, means to remove the caps from said bottles at a point in said path, means to tip said bottles upsidedown twice in said path after removal of said caps, means to collect the contents poured from said bottles during said first tipping, means to fill said bottles with hot milk after said first tipping, means to collect said hot milk rinsings during said second tipping, and means to collect cream adhering to said removed bottle caps.

8. In a machine of the class described, a rotating hub, pins projecting from the periphery thereof, means to move a series of containers having perforatable caps past said rotating hub, and means to move said hub in timed relation with the movement of said containers, said pins having points at their ends to pierce said caps and remove them from said containers.

9. In a machine of the class described, a rotating hub, pins projecting from the periphery thereof, means to move a series of containers having perforatable caps past said rotating hub, and means to move said hub in timed relation with the movement of said containers, said pins having barbed points at their ends to pierce said caps and remove them from said containers.

10. In a machine of the class described, a rotating hub, pins projecting from the periphery thereof, means to move a series of containers having perforatable caps past said rotating hub, means to move said hub in timed relation with the movement of said containers, said pins having cap-piercing and removing ends, and means in the line of movement of said removed caps to remove adhering container contents from said caps.

11. In a machine of the class described, a rotating hub, pins projecting from the periphery thereof, means to move a series of containers having perforatable caps past said rotating hub, means to move said hub in timed relation with the movement of said containers, said pins having cap-piercing and removing ends, and means in the line of movement of said removed caps to remove and collect adhering container contents from said caps.

12. In a machine of the class described, a rotating hub, pins projecting from the periphery thereof, means to move a series of containers having perforatable caps past said rotating hub, means to move said hub in timed relation with the movement of said containers, said pins having cap-piercing and removing ends, and means in the line of movement of said removed caps to retain said caps as said cap-carrying pins move therepast.

13. In a machine of the class described, a rotating hub, pins projecting from the periphery thereof, means to move a series of containers having perforatable caps past said rotating hub, means to move said hub in timed relation with the movement of said containers, said pins having cap-piercing and removing ends, and means in the line of movement of said removed caps to retain and collect said caps as said cap-carrying pins move therepast.

14. In a machine of the class described, a rotating hub, pins projecting from the periphery thereof, means to move a series of containers having perforatable caps past said rotating hub, means to move said hub in timed relation with the movement of said containers, said pins having cap-piercing and removing ends, means in the line of movement of said removed caps to remove adhering container contents from said caps, and means further on in the line of movement of said caps to retain said caps as said cap-carrying pins move therepast.

15. In a machine of the class described, a rotating hub, pins projecting from the periphery thereof, means to move a series of containers having perforatable caps past said rotating hub, means to move said hub in timed relation with the movement of said containers, said pins having cap-piercing and removing ends, means in the line of movement of said removed caps to remove and collect adhering container contents from said caps, and means further on in the line of movement of said caps to retain said caps as said cap-carrying pins move therepast.

16. In a machine of the class described, a rotating hub, pins projecting from the periphery thereof, means to move a series of containers having perforatable caps past said rotating hub, means to move said hub in timed relation with the movement of said containers, said pins having cap-piercing and removing ends, means in the line of movement of said removed caps to remove adhering container contents from said caps, and means further on in the line of movement of said caps to retain and collect said caps as said cap-carrying pins move therepast.

17. In a machine of the class described, a rotating hub, pins projecting from the periphery thereof, means to move a series of containers having perforatable caps past said rotating hub, means to move said hub in timed relation with the movement of said containers, said pins having cap-piercing and removing ends, means in the line of movement of said removed caps to remove and collect adhering container contents from said caps, and means further on in the line of movement of said caps to retain and collect said caps as said cap-carrying pins move therepast.

18. In a machine for collecting contents of containers sealed with caps and content material adhering to said caps, means to move said containers in a path, means to move said caps in another path, whereby said containers and said caps are mutually separated, and means simultaneously to dump said containers at a predetermined point in their path and to scrape off and collect material adhering to said caps at a predetermined point in their path.

19. In a machine of the class described, radially arranged arms, container holders at the ends of said arms, mechanism to open said holders to grasp upright containers serially, mechanism to rotate said arms about a common axis, mechanism to rotate intermittently said arms each about an individual axis, and mechanism to open said holders to release said containers when again in upright position.

20. In a device of the class described, means to feed containers serially in an upright position, a fluid collector, means to grasp said containers serially as fed to carry them over said collector, to tip them thereover to dump them, to hold them tipped thereover to drain them, and then to turn them upright and release them.

GODFREY CHRISTENSEN.